US009990317B2

United States Patent
Mishra et al.

(10) Patent No.: US 9,990,317 B2
(45) Date of Patent: Jun. 5, 2018

(54) FULL-MASK PARTIAL-BIT-FIELD (FM-PBF) TECHNIQUE FOR LATENCY SENSITIVE MASKED-WRITE

(71) Applicant: QUALCOMM Incorporated, San Diego, CA (US)

(72) Inventors: Lalan Jee Mishra, San Diego, CA (US); Richard Wietfeldt, San Diego, CA (US); Helena Deirdre O'Shea, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 15/346,602

(22) Filed: Nov. 8, 2016

(65) Prior Publication Data
US 2017/0147521 A1    May 25, 2017

Related U.S. Application Data

(60) Provisional application No. 62/259,543, filed on Nov. 24, 2015.

(51) Int. Cl.
| | |
|---|---|
| *G06F 13/36* | (2006.01) |
| *G06F 12/00* | (2006.01) |
| *G06F 13/362* | (2006.01) |
| *G06F 9/30* | (2018.01) |

(52) U.S. Cl.
CPC ........ *G06F 13/362* (2013.01); *G06F 9/30101* (2013.01)

(58) Field of Classification Search
None
See application file for complete search history.

(56) References Cited

U.S. PATENT DOCUMENTS

| | | | |
|---|---|---|---|
| 6,052,522 A | 4/2000 | Mattela et al. | |
| 6,732,206 B1 * | 5/2004 | Jensen | H04L 29/12254 370/366 |
| 7,895,381 B2 | 2/2011 | Weng | |
| 8,452,897 B1 | 5/2013 | Fernald et al. | |

(Continued)

FOREIGN PATENT DOCUMENTS

WO    WO-0213020 A2    2/2002

OTHER PUBLICATIONS

Anonymous: "RS422 Device Bus Protocol", Oct. 19, 2007, XP055334388, 7 pages. Retrieved from the Internet: URL: http://web.archive.org/web/20071019104938/http://frmb.org/doc-mirror/sermon2/protocol.html.

(Continued)

*Primary Examiner* — Hyun Nam
(74) *Attorney, Agent, or Firm* — Loza & Loza LLP

(57) ABSTRACT

Systems, methods, and apparatus for data communication are provided. An apparatus maybe configured to generate a mask field in a packet to be transmitted through an interface to a slave device, the mask field having a first number of bits, provide a control-bit field in the packet, the control-bit field having a second number of bits, where the second number of bits is less than the first number of bits, and transmit the packet through the interface. The packet may be addressed to a control register of the slave device. The control register may have the first number of bits. Each bit in the control-bit field may correspond to a bit of the control register that is identified by the mask field.

30 Claims, 15 Drawing Sheets

(56) References Cited

U.S. PATENT DOCUMENTS

| | | |
|---|---|---|
| 9,135,010 B2 | 9/2015 | Moyer et al. |
| 2002/0110111 A1* | 8/2002 | Couture ............. H04Q 11/0457 370/352 |
| 2003/0005210 A1* | 1/2003 | Thummalapally ......................... G06F 17/30982 711/1 |
| 2004/0066673 A1* | 4/2004 | Perego ................. G11C 7/1051 365/200 |
| 2007/0025361 A1 | 2/2007 | Lin et al. |
| 2007/0063877 A1* | 3/2007 | Shmunk ............. G10L 19/0204 341/50 |
| 2015/0046616 A1 | 2/2015 | Pedersen et al. |

OTHER PUBLICATIONS

International Search Report and Written Opinion—PCT/US2016/061172—ISA/EPO—Feb. 1, 2017.

* cited by examiner

1000 ⟶

| Num-Bits to Modify | Total Bits Needed (8-bit mask) | | Effective Bit-Field Length/Latency Reduction (%) |
|---|---|---|---|
| | Conventional Method | FM-PBF Write | |
| 1 | 16 | 9 | 43.75 |
| 2 | 16 | 10 | 37.50 |
| 3 | 16 | 11 | 31.25 |
| 4 | 16 | 12 | 25.00 |
| 5 | 16 | 13 | 18.75 |
| 6 | 16 | 14 | 12.50 |
| 7 | 16 | 15 | 6.25 |
| 8 | 16 | 16 | 0.00 |

1020 ⟶

| Num-Bits to Modify | Total Bits Needed (16-bit mask) | | Effective Bit-Field Length/Latency Reduction (%) |
|---|---|---|---|
| | Conventional Method | FM-PBF Write | |
| 1 | 32 | 17 | 46.88 |
| 2 | 32 | 18 | 43.75 |
| 3 | 32 | 19 | 40.63 |
| 4 | 32 | 20 | 37.50 |
| 5 | 32 | 21 | 34.38 |
| 6 | 32 | 22 | 31.25 |
| 7 | 32 | 23 | 28.13 |
| 8 | 32 | 24 | 25.00 |
| 9 | 32 | 25 | 21.88 |
| 10 | 32 | 26 | 18.75 |
| 11 | 32 | 27 | 15.63 |
| 12 | 32 | 28 | 12.50 |
| 13 | 32 | 29 | 9.38 |
| 14 | 32 | 30 | 6.25 |
| 15 | 32 | 31 | 3.13 |
| 16 | 32 | 32 | 0.00 |

*FIG. 10*

FULL-MASK PARTIAL-BIT-FIELD (FM-PBF) TECHNIQUE FOR LATENCY SENSITIVE MASKED-WRITE

CROSS-REFERENCE TO RELATED APPLICATIONS

This application claims priority to and the benefit of U.S. Provisional Application Ser. No. 62/259,543, entitled "FULL-MASK PARTIAL-BIT-FIELD (FM-PBF) TECHNIQUE FOR LATENCY SENSITIVE MASKED-WRITE" filed on Nov. 24, 2015, the entire contents of which is incorporated herein by reference.

BACKGROUND

Field

The present disclosure relates generally to communication devices, and more particularly, to communications links connecting integrated circuit devices within an apparatus.

Background

Serial interfaces have become the preferred method for digital communication between integrated circuit (IC) devices in various apparatus. For example, mobile communications equipment may perform certain functions and provide capabilities using IC devices that include radio frequency transceivers, cameras, display systems, user interfaces, controllers, storage, and the like. General-purpose serial interfaces known in the industry, including the Inter-Integrated Circuit (I2C or I²C) serial bus and its derivatives and alternatives, including interfaces defined by the Mobile Industry Processor Interface (MIPI) Alliance, such as I3C and the Radio Frequency Front End (RFFE) interface.

In one example, the I2C serial bus is a serial single-ended computer bus that was intended for use in connecting low-speed peripherals to a processor. Some interfaces provide multi-master buses in which two or more devices can serve as a bus master for different messages transmitted on the serial bus. In another example, the RFFE interface defines a communication interface for controlling various radio frequency (RF) front end devices, including power amplifier (PA), low-noise amplifiers (LNAs), antenna tuners, filters, sensors, power management devices, switches, etc. These devices may be collocated in a single integrated circuit (IC) or provided in multiple IC devices. In a mobile communications device, multiple antennas and radio transceivers may support multiple concurrent RF links. Certain functions can be shared among the front end devices and the RFFE interface enables concurrent and/or parallel operation of transceivers using multi-master, multi-slave configurations.

As the demand for improved communications between devices continues to increase, there exists a need for improvements in protocols and methods for managing the interfaces between RF front end devices.

SUMMARY

Certain aspects of the disclosure relate to systems, apparatus, methods and techniques for implementing and managing digital communication interfaces that may be used between IC devices in various apparatus.

In various aspects of the disclosure, a method performed by a device operating as a bus master may include generating a mask field in a packet to be transmitted through an interface to a slave device, the mask field having a first number of bits, providing a control-bit field in the packet, the control-bit field having a second number of bits, where the second number of bits is less than the first number of bits, wherein the mask field is generated to identify at least one bit location in a control register of the slave device in which at least one bit of the control-bit field is to be written by providing a first bit value in each bit location of the mask field that corresponds to a bit location in the control register in which a bit of the of the control-bit field is to be written, and transmitting the packet through the interface. The packet may be addressed to the control register of the slave device. The control register may have the first number of bits. Each bit in the control-bit field may correspond to a bit location in the control register that is identified by the mask field.

In various aspects of the disclosure, an apparatus may be adapted to generate a mask field in a packet to be transmitted through an interface to a slave device, the mask field having a first number of bits, provide a control-bit field in the packet, the control-bit field having a second number of bits, where the second number of bits is less than the first number of bits, wherein the mask field is generated to identify at least one bit location in a control register of the slave device in which at least one bit of the control-bit field is to be written by providing a first bit value in each bit location of the mask field that corresponds to a bit location in the control register in which a bit of the of the control-bit field is to be written, and transmit the packet through the interface. The packet may be addressed to the control register of the slave device. The control register may have the first number of bits. Each bit in the control-bit field may correspond to a bit location in the control register that is identified by the mask field.

In various aspects of the disclosure, an apparatus may have means for generating a mask field in a packet to be transmitted through an interface to a slave device, the mask field having a first number of bits, means for providing a control-bit field in the packet, the control-bit field having a second number of bits, where the second number of bits is less than the first number of bits, wherein the mask field is generated to identify at least one bit location in a control register of the slave device in which at least one bit of the control-bit field is to be written by providing a first bit value in each bit location of the mask field that corresponds to a bit location in the control register in which a bit of the of the control-bit field is to be written, and means for transmitting the packet through the interface. The packet may be addressed to the control register of the slave device. The control register may have the first number of bits. Each bit in the control-bit field may correspond to a bit location in the control register that is identified by the mask field.

In various aspects of the disclosure, a processor readable storage medium is disclosed. The storage medium may be a non-transitory storage medium and may store code that, when executed by one or more processors, causes the one or more processors to generate a mask field in a packet to be transmitted through an interface to a slave device, the mask field having a first number of bits, provide a control-bit field in the packet, the control-bit field having a second number of bits, where the second number of bits is less than the first number of bits, wherein the mask field is generated to identify at least one bit location in a control register of the slave device in which at least one bit of the control-bit field is to be written by providing a first bit value in each bit location of the mask field that corresponds to a bit location in the control register in which a bit of the of the control-bit field is to be written, and transmit the packet through the interface. The packet may be addressed to the control register of the slave device. The control register may have the first number of bits. Each bit in the control-bit field may correspond to a bit location in the control register that is identified by the mask field.

In various aspects of the disclosure, a method performed by a slave device coupled to a bus may include receiving a packet from the bus, where the packet is addressed to a control register of the slave device and includes a mask field and a control-bit field, the mask field having a greater number of bits than the control-bit field, identifying at least one bit in the mask field having a first value, detecting at least one bit in the control-bit field corresponding to the at least one bit in the mask field having the first value, obtaining a load value to write to the control register based on the at least one bit in the control-bit field, and writing the load value to the control register, wherein each bit location in the control register identified by the mask field as corresponding to an associated bit in the control-bit field contains a bit value based on the associated bit in the control-bit field.

In various aspects of the disclosure, an apparatus may be adapted to receive a packet from the bus, where the packet is addressed to a control register of the slave device and includes a mask field and a control-bit field, the mask field having a greater number of bits than the control-bit field, identify at least one bit in the mask field having a first value, detect at least one bit in the control-bit field corresponding to the at least one bit in the mask field having the first value, obtain a load value to write to the control register based on the at least one bit in the control-bit field, and write the load value to the control register, wherein each bit location in the control register identified by the mask field as corresponding to an associated bit in the control-bit field contains a bit value based on the associated bit in the control-bit field.

In various aspects of the disclosure, an apparatus may have means for receiving a packet from the bus, where the packet is addressed to a control register of the slave device and includes a mask field and a control-bit field, the mask field having a greater number of bits than the control-bit field, means for identifying at least one bit in the mask field having a first value, means for detecting at least one bit in the control-bit field corresponding to the at least one bit in the mask field having the first value, means for obtaining a load value to write to the control register based on the at least one bit in the control-bit field, and means for writing the load value to the control register, wherein each bit location in the control register identified by the mask field as corresponding to an associated bit in the control-bit field contains a bit value based on the associated bit in the control-bit field.

In an aspect of the disclosure, a processor readable storage medium is disclosed. The storage medium may be a non-transitory storage medium and may store code that, when executed by one or more processors, causes the one or more processors to receive a packet from the bus, where the packet is addressed to a control register of the slave device and includes a mask field and a control-bit field, the mask field having a greater number of bits than the control-bit field, identify at least one bit in the mask field having a first value, detect at least one bit in the control-bit field corresponding to the at least one bit in the mask field having the first value, obtain a load value to write to the control register based on the at least one bit in the control-bit field, and write the load value to the control register, wherein each bit location in the control register identified by the mask field as corresponding to an associated bit in the control-bit field contains a bit value based on the associated bit in the control-bit field.

BRIEF DESCRIPTION OF THE DRAWINGS

FIG. 10 illustrates reductions in latency obtained from FM-PBF write performed in accordance with certain aspects disclosed herein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Example of an Apparatus with Multiple IC Device Subcomponents

Figure 1:
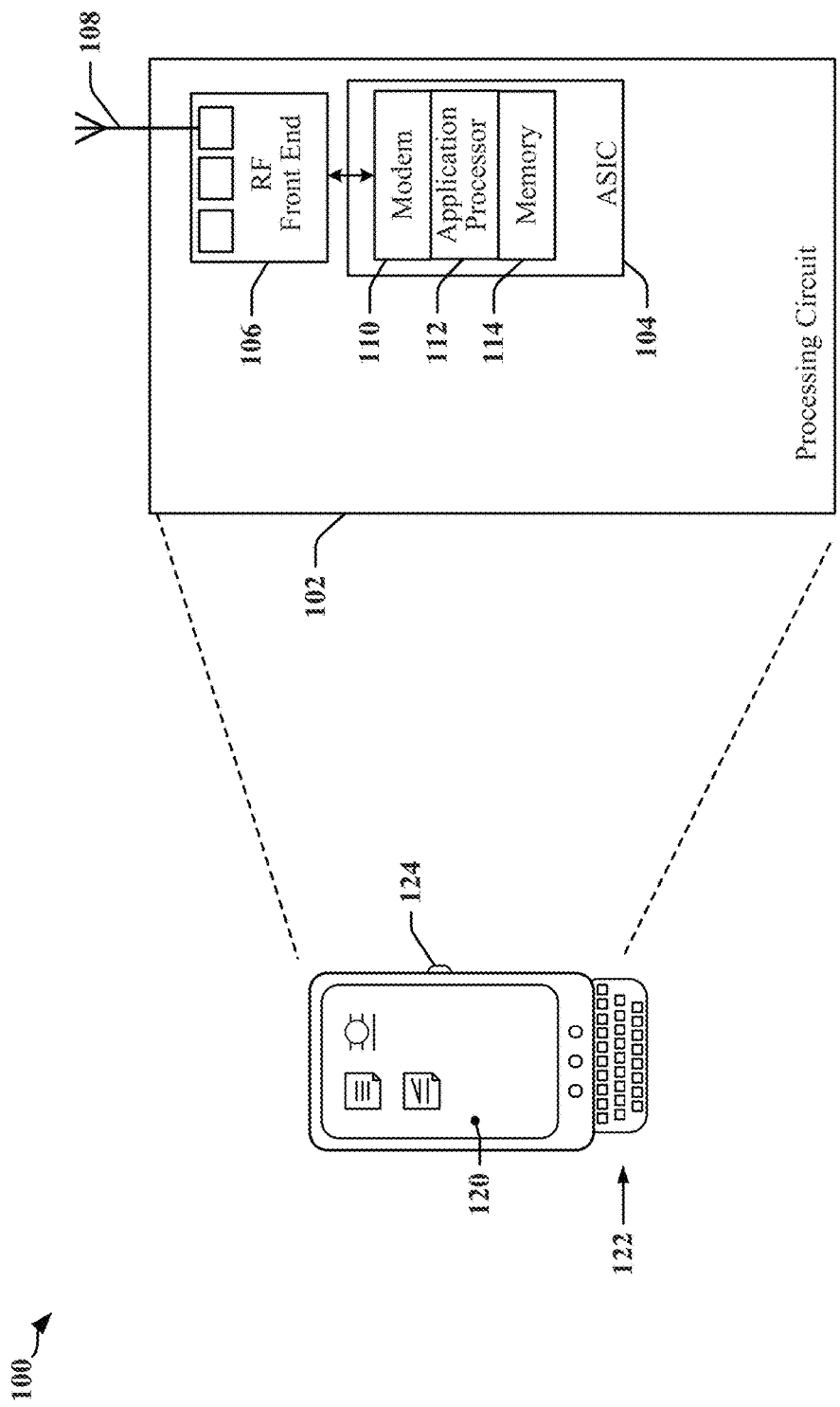
FIG. 1 depicts an apparatus that includes an RF front end and that may be adapted according to certain aspects disclosed herein.

Certain aspects of the invention may be applicable to communications links deployed between electronic devices that include subcomponents of an apparatus such as a telephone, a mobile computing device, an appliance, automobile electronics, avionics systems, etc. FIG. 1 depicts an apparatus 100 that may employ a communication link between IC devices. In one example, the apparatus 100 may be a communication device. The apparatus 100 may include a processing circuit having two or more IC devices 104, 106 that may be coupled using a first communication link. One IC device may be include a radio frequency (RF) front end 106 that may be operated to enable the apparatus to communicate through one or more antennas 108 with a radio access network, a core access network, the Internet and/or another network. The RF front end 106 may include a plurality of devices coupled by a second communication link, which may include a radio frequency front end (RFFE) bus.

The processing circuit 102 may include one or more application-specific IC (ASIC) devices. An IC device 104 may include and/or be coupled to one or more processing devices 112, logic circuits, one or more modems 110, and processor readable storage such as a memory device 114 that may maintain instructions and data that may be executed by a processor on the processing circuit 102. The processing circuit 102 may be controlled by one or more of an operating system and an application programming interface (API) layer that supports and enables execution of software modules residing in storage media. The memory device 114 may include read-only memory (ROM) or random-access memory (RAM), electrically erasable programmable ROM (EEPROM), flash cards, or any memory device that can be used in processing systems and computing platforms. The processing circuit 102 may include or have access to a local database or parameter storage that can maintain operational parameters and other information used to configure and operate apparatus 100. The local database may be implemented using one or more of a database module, flash memory, magnetic media, EEPROM, optical media, tape, soft or hard disk, or the like. The processing circuit may also be operably coupled to external devices such as the antennas 108, a display 120, operator controls, such as a button 124 and/or an integrated or external keypad 122, among other components.

Overview of the RFFE Bus

Figure 2:
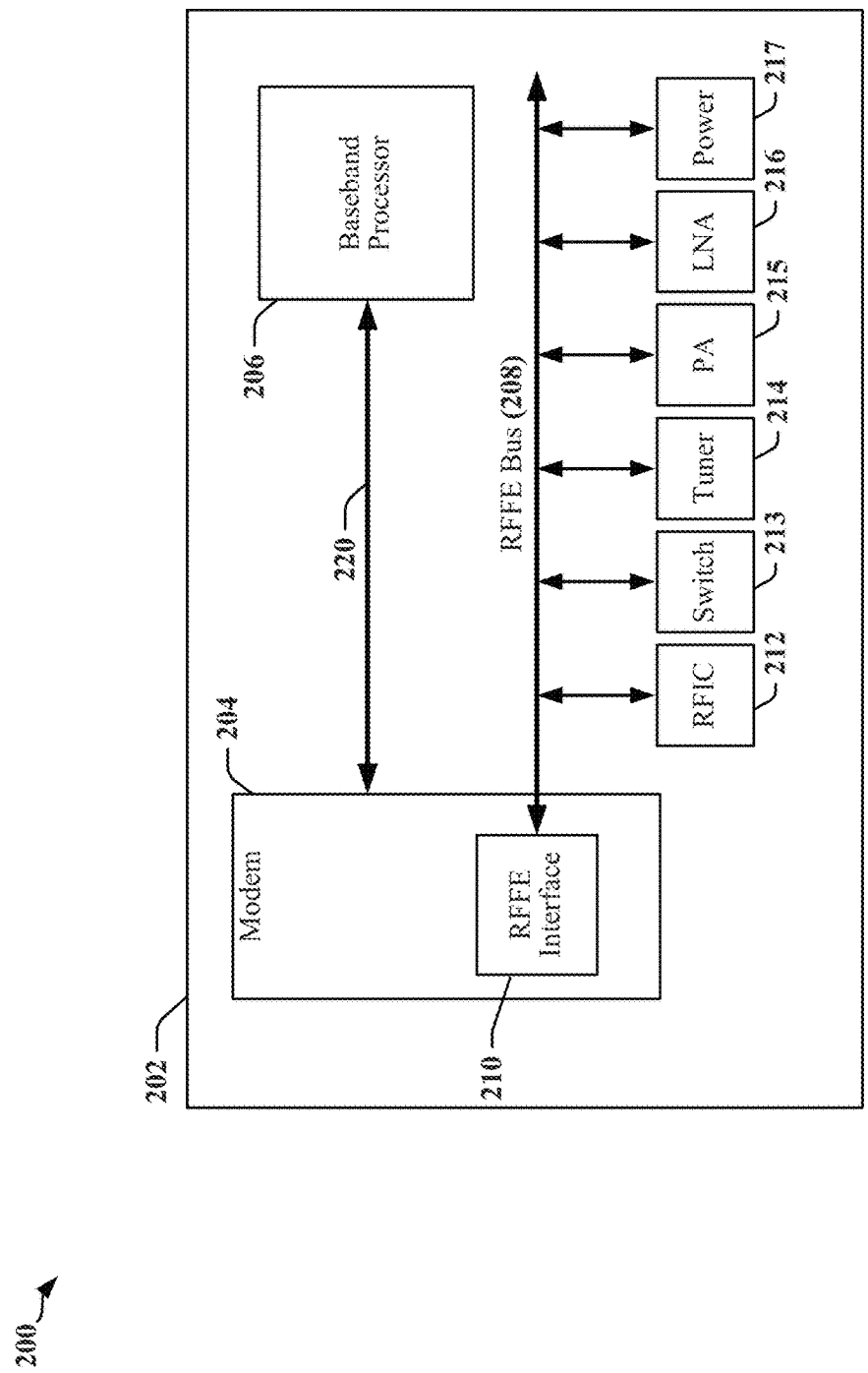
FIG. 2 is a block diagram illustrating a device that employs an RFFE bus to couple various front end devices.

FIG. 2 is a block diagram 200 illustrating an example of a device 202 that employs an RFFE, bus 208 to couple various front end devices 212-217. A modem 204 may also be coupled to the RFFE bus 208. The modem may communicate with a baseband processor 206. The illustrated device 202 may be embodied in one or more of a mobile device, a mobile telephone, a mobile computing system, a telephone, a notebook computer, a tablet computing device, a media player, a gaming device, a wearable computing and/or communications device, an appliance, or the like. In various examples, the device 202 may be implemented with one or more baseband processors 206, modems 204, multiple communications links 208, 220, and various other buses, devices and/or different functionalities.

In the example illustrated in FIG. 2, the RFFE bus 208 may be coupled to an RF integrated circuit (RFIC) 212, which may include one or more controllers, and/or processors that configure and control certain aspects of the RF front end. The RFFE bus 208 may couple the RFIC 212 to a switch 213, an RF tuner 214, a power amplifier (PA) 215, a low noise amplifier (LNA) 216, and a power management module 217.

Figure 3:
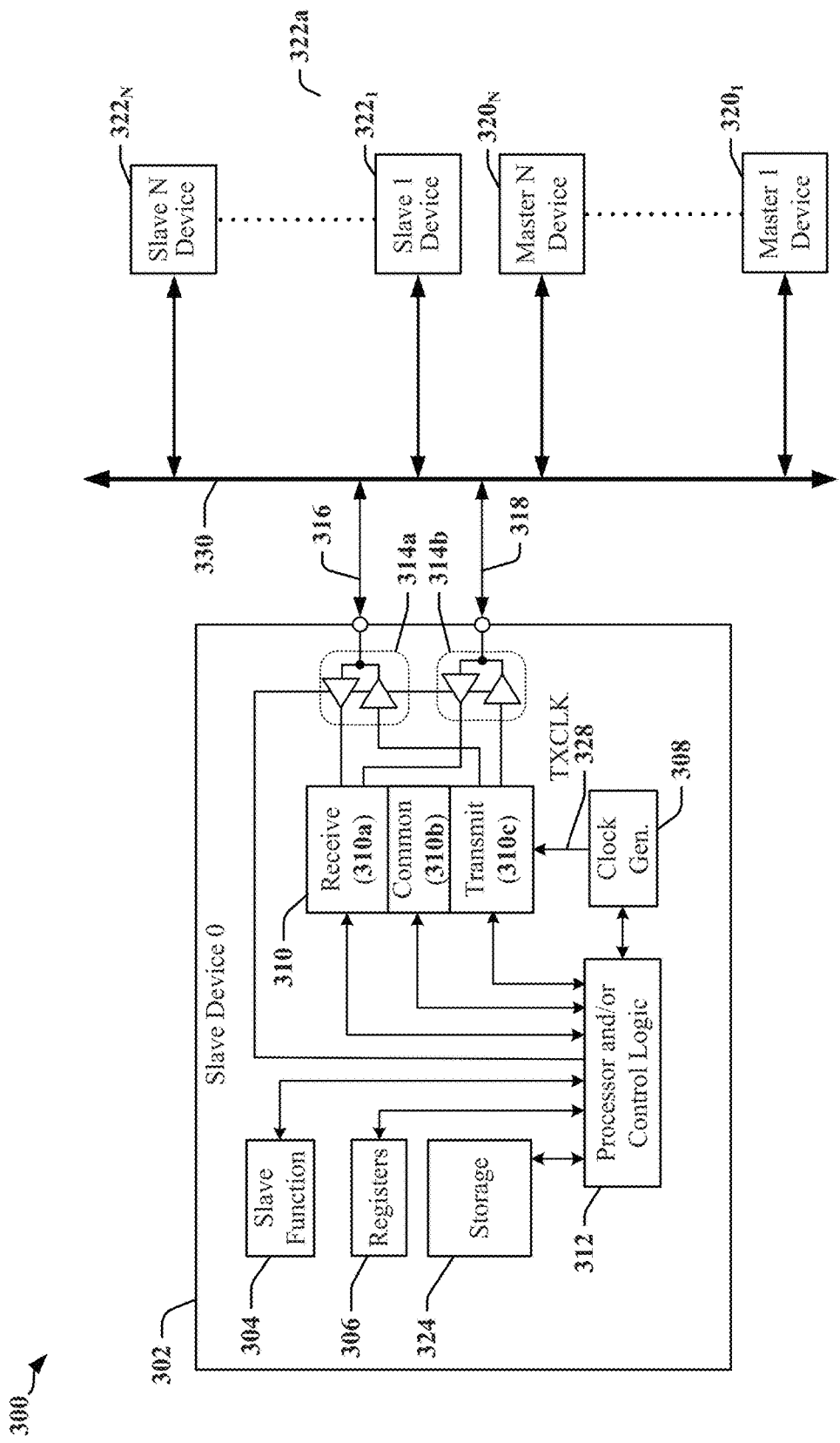
FIG. 3 is a diagram that illustrates an example of a system architecture for an apparatus employing a data link between IC devices according to certain aspects disclosed herein.

FIG. 3 is a block schematic diagram illustrating an example of an architecture for a device 300 that may employ an RFFE bus 330 to connect bus master devices $320_1$-$320_N$ and slave devices 302 and $322_1$-$322_N$. The RFFE bus 330 may be configured according to application needs, and access to multiple buses 330 may be provided to certain of the devices $320_1$-$320_N$, 302, and $322_1$-$322_N$. In operation, one of the bus master devices $320_1$-$320_N$ may gain control of the bus and transmit a slave identifier (slave address) to identify one of the slave devices 302 and $322_1$-$322_N$ to engage in a communication transaction. Bus master devices $320_1$-$320_N$ may read data and/or status from slave devices 302 and $322_1$-$322_N$, and may write data to memory or may configure the slave devices 302 and $322_1$-$322_N$. Configuration may involve writing to one or more registers or other storage on the slave devices 302 and $322_1$-$322_N$.

In the example illustrated in FIG. 3, a first slave device 302 coupled to the RFFE bus 330 may respond to one or more bus master devices $320_1$-$320_N$, which may read data from, or write data to the first slave device 302. In one example, the first slave device 302 may include or control a power amplifier (see the PA 215 in FIG. 2), and one or more bus master devices $320_1$-$320_N$ may from time-to-time configure a gain setting at the first slave device 302.

The first slave device 302 may include configuration registers 306 and/or other storage devices 324, a processing circuit and/or control logic 312, a transceiver 310 and a number of line driver/receiver circuits 314a, 314b as needed to couple the first slave device 302 to the RFFE bus 330 (e.g., via a serial clock line 316 and a serial data line 318). The processing circuit and/or control logic 312 may include a processor such as a state machine, sequencer, signal processor or general-purpose processor. The transceiver 310 may include one or more receivers 310a, one or more transmitters 310c and certain common circuits 310b, including timing, logic and storage circuits and/or devices. In some instances, the transceiver 310 may include encoders and decoders, clock and data recovery circuits, and the like. A transmit clock (TXCLK) signal 328 may be provided to the transmitter 310c, where the TXCLK signal 328 can be used to determine data transmission rates.

The RFFE bus 330 is typically implemented as a serial bus in which data is converted from parallel to serial form by a transmitter, which transmits the encoded data as a serial bitstream. A receiver processes the received serial bitstream using a serial-to-parallel convertor to deserialize the data.

Masked-Writes on a Shared Bus

Figure 4:
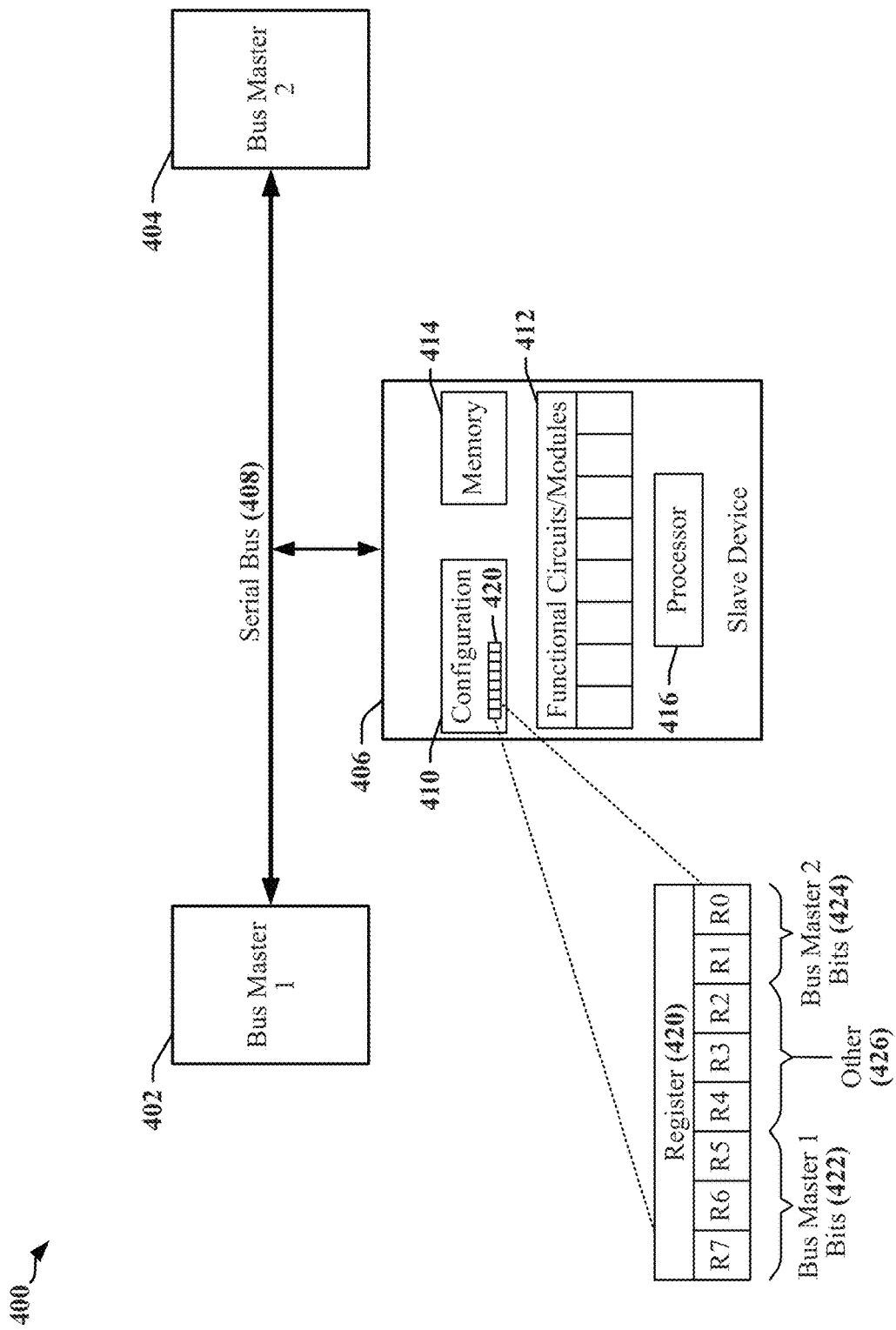
FIG. 4 is a diagram illustrating an example of apparatus in which masked-write operations may be used.

Certain aspects disclosed herein relate to masked-write operations that may be used in certain applications where low-latency responses are desired, and/or where a single resource may be written, modified, or otherwise addressed by multiple bus masters. FIG. 4 illustrates an example of apparatus 400 in which a masked-write operation may be used. The apparatus 400 may be provided in a mobile communications device, for example, and may include two or more bus master devices 402, 404 and at least one slave device 406 communicatively coupled by a serial bus 408. The serial bus may be an I2C bus, a camera control interface (CCI) bus, an I3C bus, or an RFFE bus, or any other bus suited to the application and function of the apparatus 400.

In one example, the serial bus 408 conforms or complies with MIPI Alliance specifications for an RFFE bus. The bus master devices 402, 404 may include a modem, application processor or controller. In the example, the slave device 406 may be a power amplifier, although the principles disclosed herein apply to other types of slave devices. The slave device 406 may include a processor 416, a memory device 414, and one or more functional circuits or modules 412. In the example of a power amplifier, the functional circuits or modules 412 may include a gain control circuit. The slave device 406 may be configurable using configuration circuits and modules 412, which may include parameter storage including a control register 420 that is writable and/or readable by the bus master devices 402, 404 through the serial bus 408. In some instances, the control register 420 may be an 8-bit register (b0-b7), where a first group of bits 422 is configured only by the first bus master device 402, a second group of bits 424 is certain bits configured only by the second bus master device 404, and a third group of bits 426 includes unused bits or bits configured by the first bus master device 402 and the second bus master device 404. Masked-write operations may be used to permit the first bus master device 402 to write the first group of bits 422 without affecting other bits 424, 426 in the control register 420, and to permit the second bus master device 404 to write the second group of bits 424 without affecting other bits 422, 426 in the control register 420.

Figure 5:
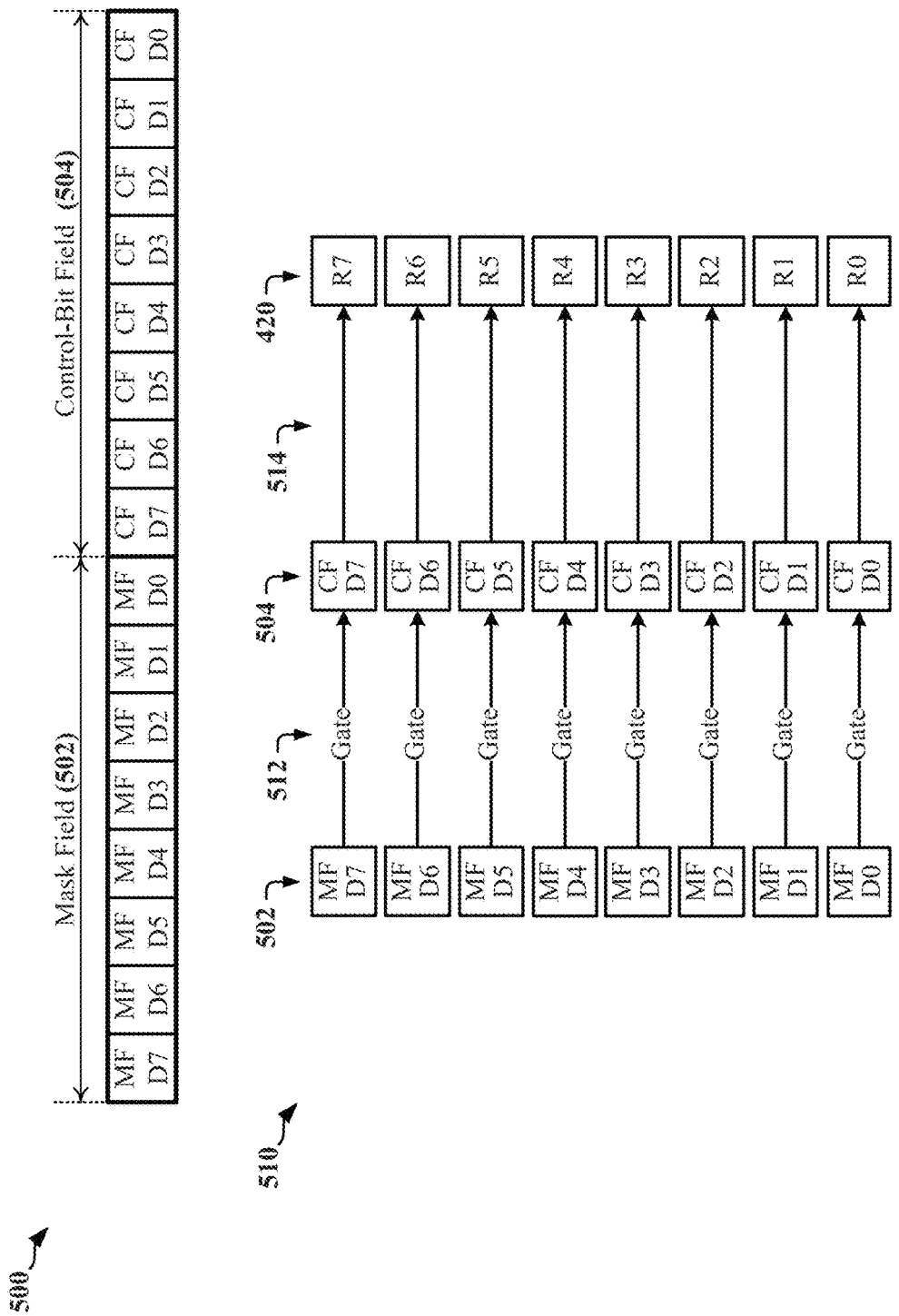
FIG. 5 illustrates a packet that may be transmitted to write control bits to the register in the slave device of FIG. 4.

FIG. 5 illustrates a packet 500 that may be transmitted to write control bits to the control register 420 in the slave device 406, for example. The packet 500 includes two 8-bit fields 502, 504. The mask field 502 has the same width as the control register 420 and indicates the bits to be written or modified in response to the packet 500. In one example, a bit in the mask field 502 with the value '1' indicates a bit location in the control register 420 that is be written or modified in response to the packet 500, and a bit in the mask field 502 with the value '0' indicates a bit location in the control register 420 that is be unaffected by the response to the packet 500. The control-bit field 504 has the same width as the control register 420 and carries the value to be written to corresponding bit locations in the control register 420.

With reference to the data flow diagram 510 in FIG. 5, each of the bits in the mask field 502 is used by a gating function 512 that operates on the corresponding bit in the control-bit field 504 to produce a bit update value 514 that selectively modifies a corresponding bit in the control register 420. In one example, the gating function 512 controlled by a bit of the mask field 502 may prevent the latching of a corresponding input of the control register 420 that causes the control register 420 to ignore a write operation for the affected bit. In another example, the gating function 512 controlled by a bit of the mask field 502 may select between a current bit value stored in the control register 420 and a corresponding bit value on the control-bit field 504 during a masked-write operation. In the example, 8-bit mask fields 502 and 8-bit control-bit fields 504 are used to perform masked-write operations on an 8-bit control register 420. That is, a 16-bit transmission is required whether 1 bit is modified or 8 bits are modified.

Full-Mask Partial-Bit-Field Writes

An apparatus in accordance with certain aspects disclosed herein may employ a modified masked-write operation that can provide decreased latency. In one example, a full-mask partial-bit-field (FM-PBF) masked-write operation can decrease the number of bits transmitted in a write operation that is used to configure or control the operation of a slave device 406.

Figure 6:
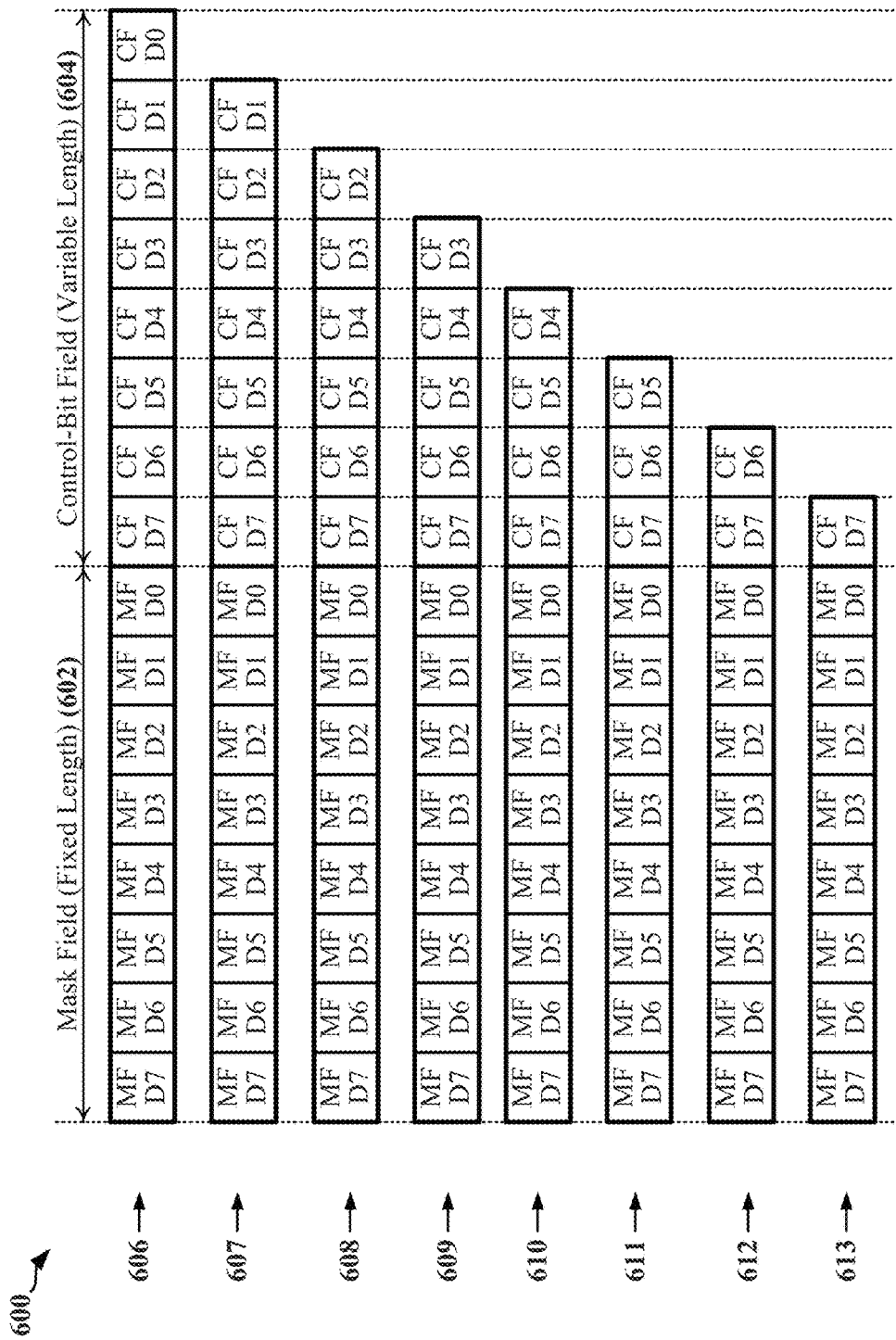
FIG. 6 illustrates examples of full-mask partial-bit-field (FM-PBF) packets in accordance with certain aspects disclosed herein.

With reference to FIG. 6, the FM-PBF write packet 600 uses a fixed, full-length mask field 602 having a first number of bits while providing a control-bit field 604 that includes only the bits (a second number of bits) that affect the control register 420. Accordingly, the length of the control-bit field 604 varies based on the nature of the masked-write to be performed. FIG. 6 illustrates the different configurations 606-613 of an FM-PBF write packet 600 that may be transmitted over the bus. The latency reduction obtained using the FM-PBF write packet 600 is a function of the number of bits to be modified. The first configuration 606 may be used to write all 8 bits of the control register 420, with the other configurations 607-613 being used to write less than 8 bits of the control register 420. The first configuration 606 may use a 16-bit transmission to write all 8 bits of the control register 420, while the eighth configuration 613 uses a 16-bit transmission to write 1 bit of the control register 420.

In a FM-PBF write packet 600, the value of a bit in the mask field 602 at a given mask-bit location implies the presence or absence of a corresponding control-bit in the control-bit field 604. The meaning of the bit in the mask field 602 may be expressed as follows:

MF-Dx=1=>CF-Dx, is available in the masked-write packet 600,

MF-Dx=0=>CF-Dx is not available in the masked-write packet 600.

When a CF-Dx bit is not available in the masked-write packet 600, the corresponding bit in the control register 420 is unaffected by the execution of the masked-write operation. When a CF-Dx bit is available, a value ('0' or '1') may be written to the corresponding bit location of the control register 420.

Certain aspects of the FM-PBF write technique may find application in low-latency environments, including in RF front ends.

Examples of Full-Mask Partial-Bit-Field Writes

Figure 7:
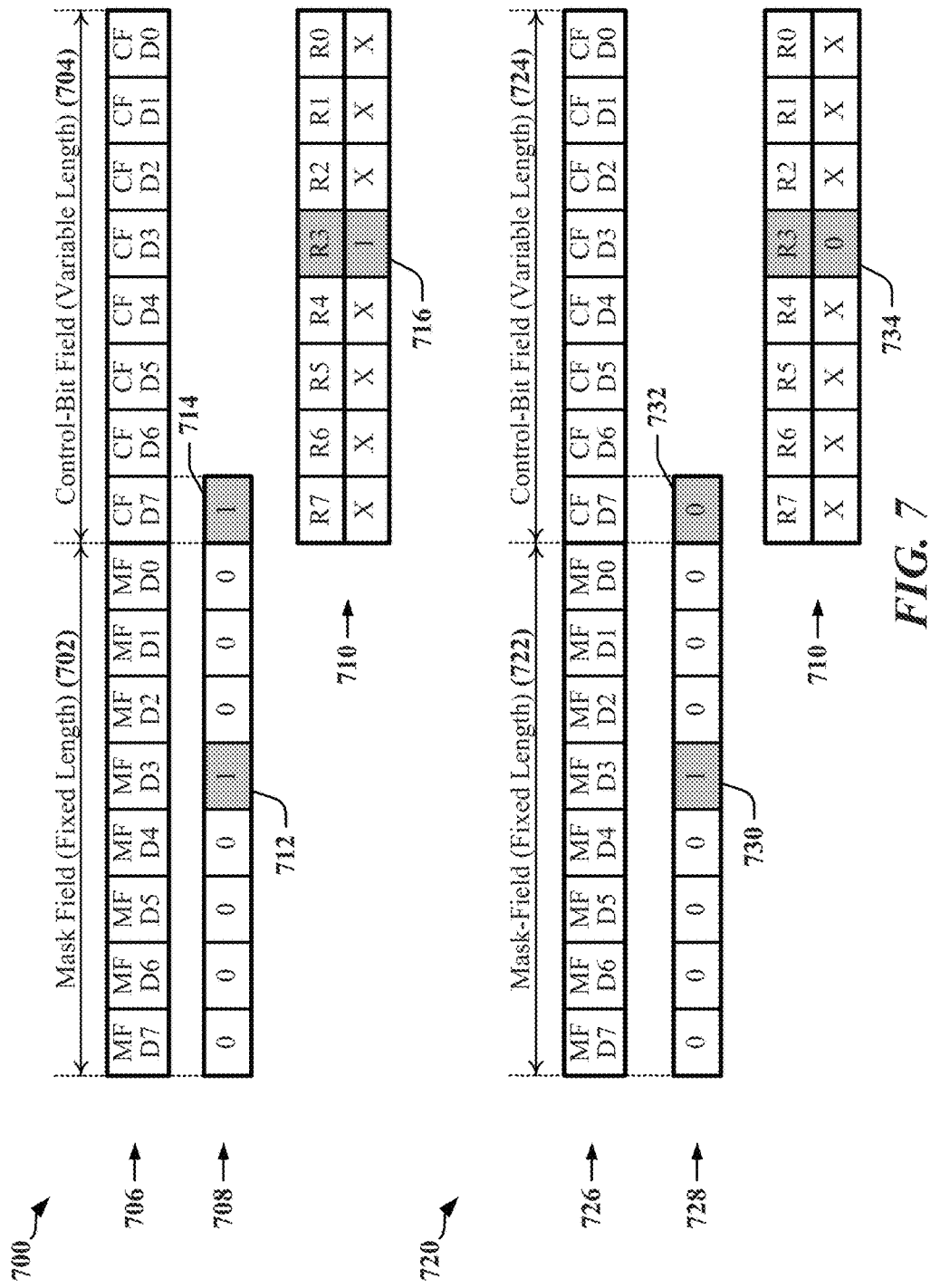
FIG. 7 illustrates FM-PBF write packets that cause a single bit to be written to a control register in accordance with certain aspects disclosed herein.
Figure 8:
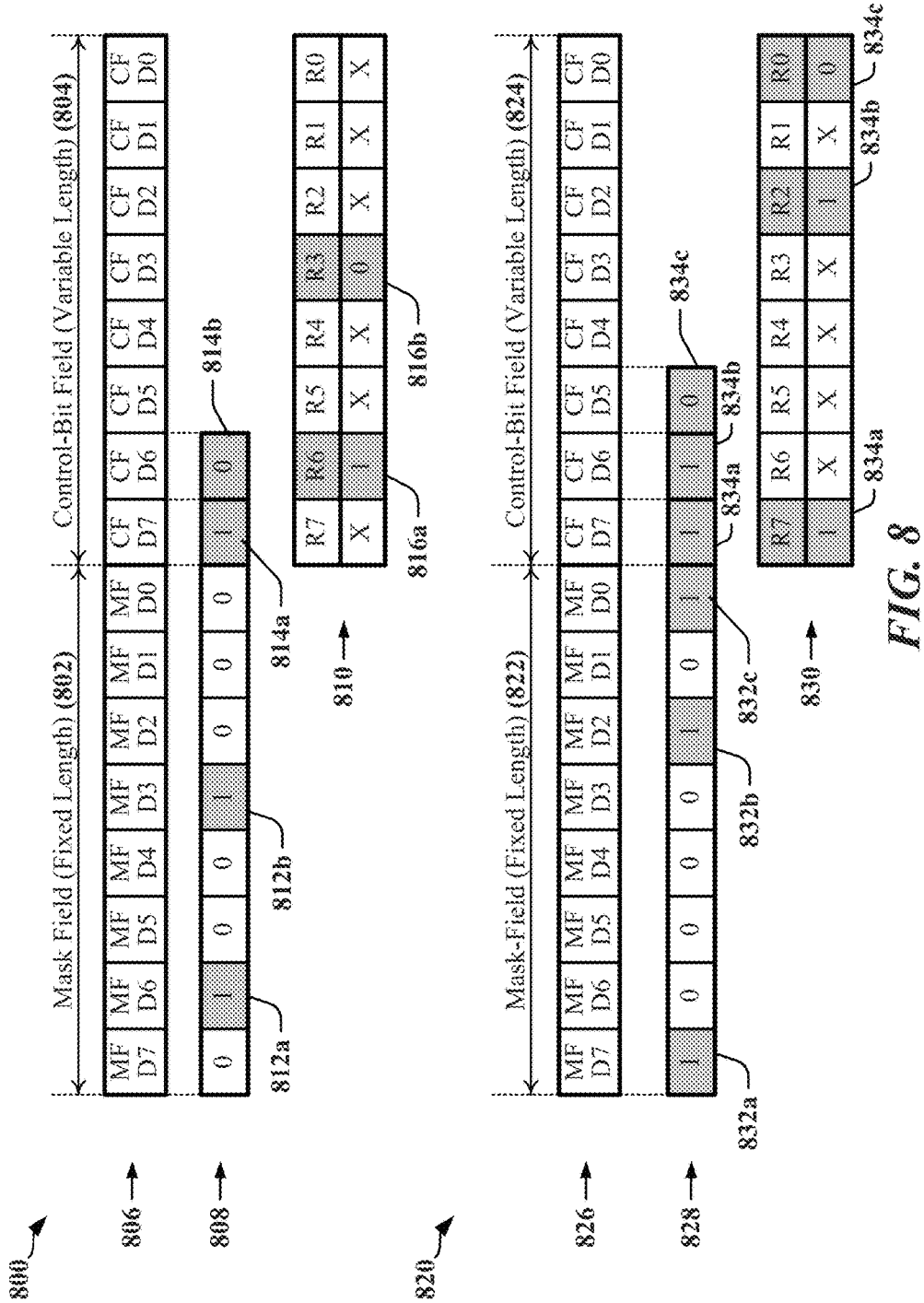
FIG. 8 illustrates FM-PBF write packets that cause multiple bits to be written to a control register in accordance with certain aspects disclosed herein.

FIGS. 7 and 8 illustrate examples of FM-PBF write operations. FIG. 7 illustrates FM-PBF write packets 700, 720 that cause a single bit to be written to a control register 710. In a first FM-PBF write packet 700, a '1' is present in the MF-D3 712 bit-location of the mask field 702, indicating the availability of a control bit 714 in the control-bit field 704. In this example, a single bit, set to a '1' value, is provided in the control-bit field 704. The remaining bits of the mask field 702 are set to '0' indicating that no other bits are available in the control-bit field 704 for writing to the control register 710. An FM-PBF write executed in response to the first FM-PBF write packet 700 causes a '1' 716 to be written to the R3 bit of the control register 710.

In a second FM-PBF write packet 720, a '1' is present in the MF-D3 bit-location 712 of the mask field 722, indicating the availability of a control bit 732 in the control-bit field 724. In this example, a single bit, set to a '0' value, is provided in the control-bit field 724. The remaining bits of the mask field 722 are set to '0' indicating that no other bits are available in the control-bit field 724 for writing to the control register 710. An FM-PBF write executed in response to the second FM-PBF write packet 720 causes a '0' 734 to be written to the R3 bit of the control register 716.

FIG. 8 illustrates FM-PBF write packets 800, 820 that cause multiple bits to be written to a control register 810, 830. In a first FM-PBF write packet 800, a '1' is present in the MF-D6 bit-location 812a and the MF-D3 bit-location 812b of the mask field 802, indicating the availability of two control bits 814a, 814b in the control-bit field 804. In this example, the first control bit 814a is set to a '1' value and the second control bit 814b is set to a '0' value. The remaining bits of the mask field 802 are set to '0' indicating that no other bits are available in the control-bit field 804 for writing to the control register 810. An FM-PBF write executed in response to the first FM-PBF write packet 800 causes a '1' 816a to be written to the R6 bit of the control register 810 and a '0' 816b to be written to the R3 bit of the control register 810.

In a second FM-PBF write packet 820, a '1' is present in the MF-D7 bit-location 832a, the MF-D2 bit-location 832b, and the MF-DO bit-location 812c of the mask field 822, indicating the availability of three control bits 834a, 834b, 834c in the control-bit field 824. In this example, the first control bit 834a is set to a '1' value, the second control bit 834b is set to a '1' value, and the third control bit 834c is set to a '0' value. The remaining bits of the mask field 822 are set to '0' indicating that no other bits are available in the control-bit field 824 for writing to the control register 830. An FM-PBF write executed in response to the first FM-PBF write packet 820 causes a '1' 836a to be written to the R7 bit of the control register 810, a '1' 836b to be written to the R2 bit of the control register 830 and a '0' 836c to be written to the R0 bit of the control register 830.

With reference again to the example illustrated in FIG. 4, a bus master 402 or 404 may wish to configure a slave device 406 that operates as an amplifier. The bus master 402 or 404 may send a sequence of FM-PBF write packets 700, 720, and/or 820 to a control register of the slave device 406 to configure the operation of the amplifier. A first FM-PBF write packet 720 may cause a '0' value to be written into an enable field of the control register, thereby disabling the amplifier during configuration. A second FM-PBF write packet 820 may cause the gain of the amplifier to be adjusted, and a third FM-PBF write packet 700 may be sent after a delay to cause a '1' value to be written into the enable field of the control register, thereby enabling the amplifier. The delay between the second and third FM-PBF write packets 820, 700 may be provided to allow the amplifier to stabilize after the gain has been changed.

Examples of Processing Full-Mask Partial-Bit-Field Write Packets

Figure 9:
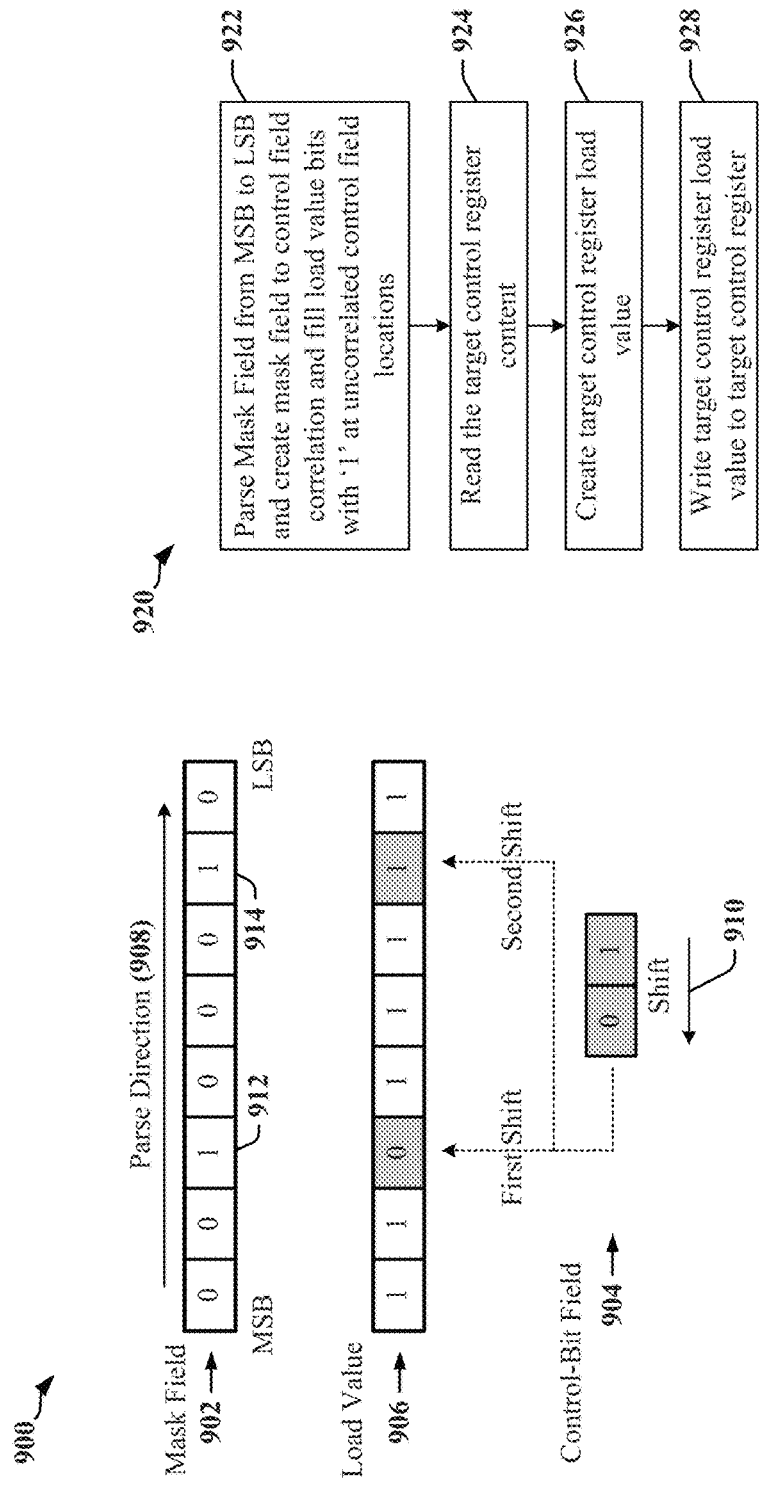
FIG. 9 illustrates an example of FM-PBF write packet processing in accordance with certain aspects disclosed herein.

FIG. 9 illustrates an example of FM-PBF write packet processing 900 using one example of a process 920 and in accordance with certain aspects disclosed herein. In the example, the FM-PBF write packet has a mask field 902 set to '00100010' value and a two-bit control-bit field 904 set to '01'. A load value register 906 may be used to build a value to be written into a target control register to which the FM-PBF write packet is addressed. As shown in block 922, the mask field 902 of the FM-PBF write packet is parsed in a direction 908 from most-significant bit (MSB) to least-significant bit (LSB). Parsing may include examining a current bit to determine whether a corresponding bit is provided in the control-bit field 904. In the example, two bits 912, 914 of the mask field 902 are set to '1', indicating the presence of corresponding bits in the control-bit field 904. When the current bit of the mask field 902 is set (set to '1'), the next value in the control-bit field may be shifted out and stored in the current bit location of the load value register 906 (corresponding to the current bit location in the mask field 902). When the current bit of the mask field 902 is cleared (set to '0'), a '1' value may be stored in the current bit location of the load value register 906. The current bit of the mask field 902 and the load value register 906 may then be advanced.

As shown in block 924, the current target control register content (TCRC) may be read when parsing of the mask field 902 has been completed. At block 926, the final load value may then be obtained by performing a logic AND of the TCRC with the masked control field data (MCFD) in the load value register 906 such that the load value register 906 takes the value: MCFD && TCRC. At block 928, the content of the load value register may be written to the target control register.

FIG. 10 includes tables 1000, 1020 that illustrate reduction in latency obtained from FM-PBF write performed in accordance with certain aspects disclosed herein. In the first table 1000, the latency reduction is shown as a comparison to a conventional masked-write operation for an 8-bit mask, 8-bit control register, and differences are shown for different numbers of bits targeted for modification. In the second table 1020, the latency reduction is shown as a comparison to a conventional masked-write operation for a 16-bit mask, 16-bit control register, and differences are shown for different numbers of bits targeted for modification.

Examples of Processing Circuits and Methods

Figure 11:
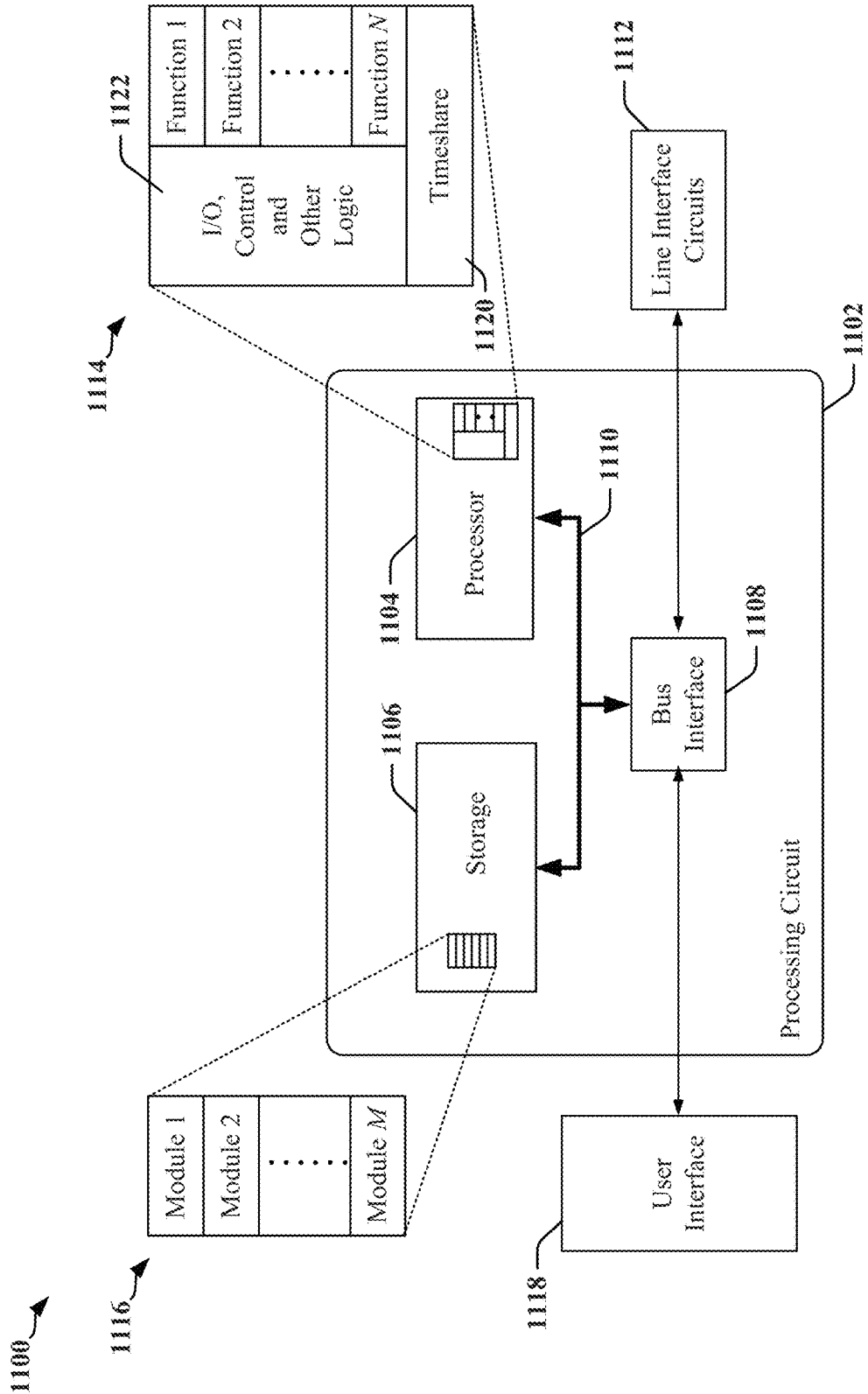
FIG. 11 is a block diagram illustrating an example of an apparatus employing a processing circuit that may be adapted according to certain aspects disclosed herein.

FIG. 11 is a conceptual diagram illustrating a simplified example of a hardware implementation for an apparatus 1100 employing a processing circuit 1102 that may be configured to perform one or more functions disclosed herein. In accordance with various aspects of the disclosure, an element, or any portion of an element, or any combination of elements as disclosed herein may be implemented using the processing circuit 1102. The processing circuit 1102 may include one or more processors 1104 that are controlled by some combination of hardware and software modules. Examples of processors 1104 include microprocessors, microcontrollers, digital signal processors (DSPs), ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112. A transceiver 1112 may be provided for each networking technology supported by the processing circuit. In some instances, multiple networking technologies may share some or all of the circuitry or processing modules found in a transceiver 1112. Each transceiver 1112 provides a means for communicating with various other apparatus over a transmission medium. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the transceiver 1112, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the transceiver 1112, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
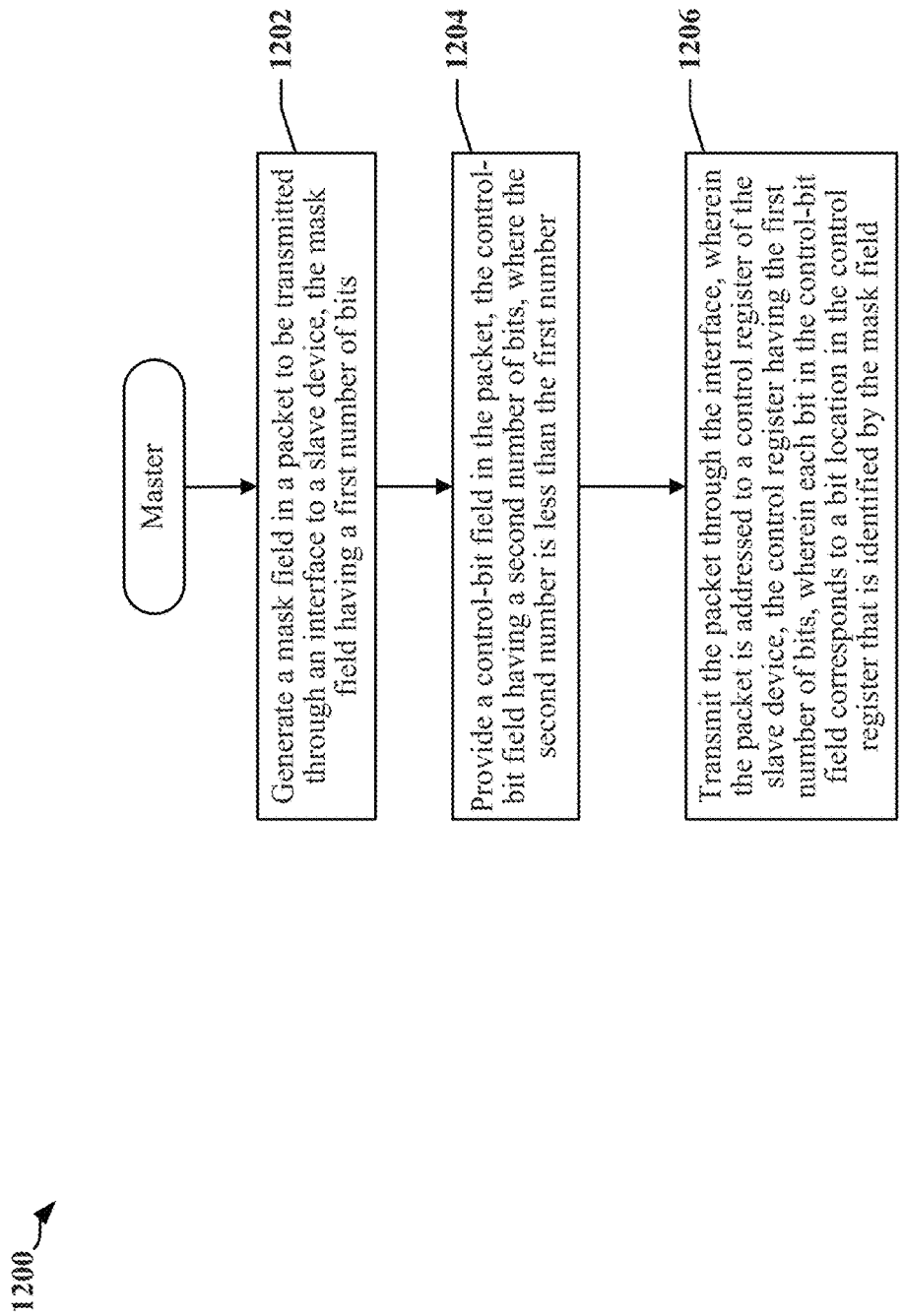
FIG. 12 is a flow chart of a method of data communication performed at a bus master device adapted in accordance with certain aspects disclosed herein.

FIG. 12 is a flow chart 1200 of a method of communication using a serial communication link. The method may be performed at a device operating as a bus master (e.g., apparatus 1100 of FIG. 11 or apparatus 1300 of FIG. 13).

The device may generate a mask field in a packet to be transmitted through an interface to a slave device, wherein the mask field has a first number of bits 1202 (e.g., 8 bits or 16 bits). The device may generate the mask field to identify at least one bit location in a control register of the slave device in which at least one bit of a control-bit field is to be written. For example, the device may provide a first bit value (e.g., bit value of '1') in each bit location of the mask field that corresponds to a bit location in the control register in which a bit of the control-bit field is to be written. The device may further generate the mask field by providing a second bit value (e.g., bit value of '0') in each bit location of the mask field that does not correspond to a bit location in the control register in which a bit of the control-bit field is to be written.

The device may provide the control-bit field in the packet 1204. The control-bit field has a second number of bits, where the second number of bits is less than the first number of bits.

The device may transmit the packet through the interface, wherein the packet is addressed to the control register of the slave device 1206. The control register has the first number of bits (e.g., 8 bits or 16 bits), wherein each bit in the control-bit field corresponds to a bit location in the control register that is identified by the mask field.

Positions of bit locations in the mask field may be independent of positions of bit locations in the control-bit field. That is, the bit locations in the mask field may have no positional correspondence to the bit locations in the control-bit field. Moreover, positions of bit locations in the control register may be independent of the positions of bit locations in the control-bit field. That is, the bit locations in the control register may have no positional correspondence to the bit locations in the control-bit field. However, in an aspect, the positions of bit locations in the mask field directly correspond to the positions of bit locations in the control register.

In one example, the interface is an RFFE interface and the slave device may be adapted to perform one or more functions of a RFFE device. In another example, the interface is an I3C interface.

Figure 13:
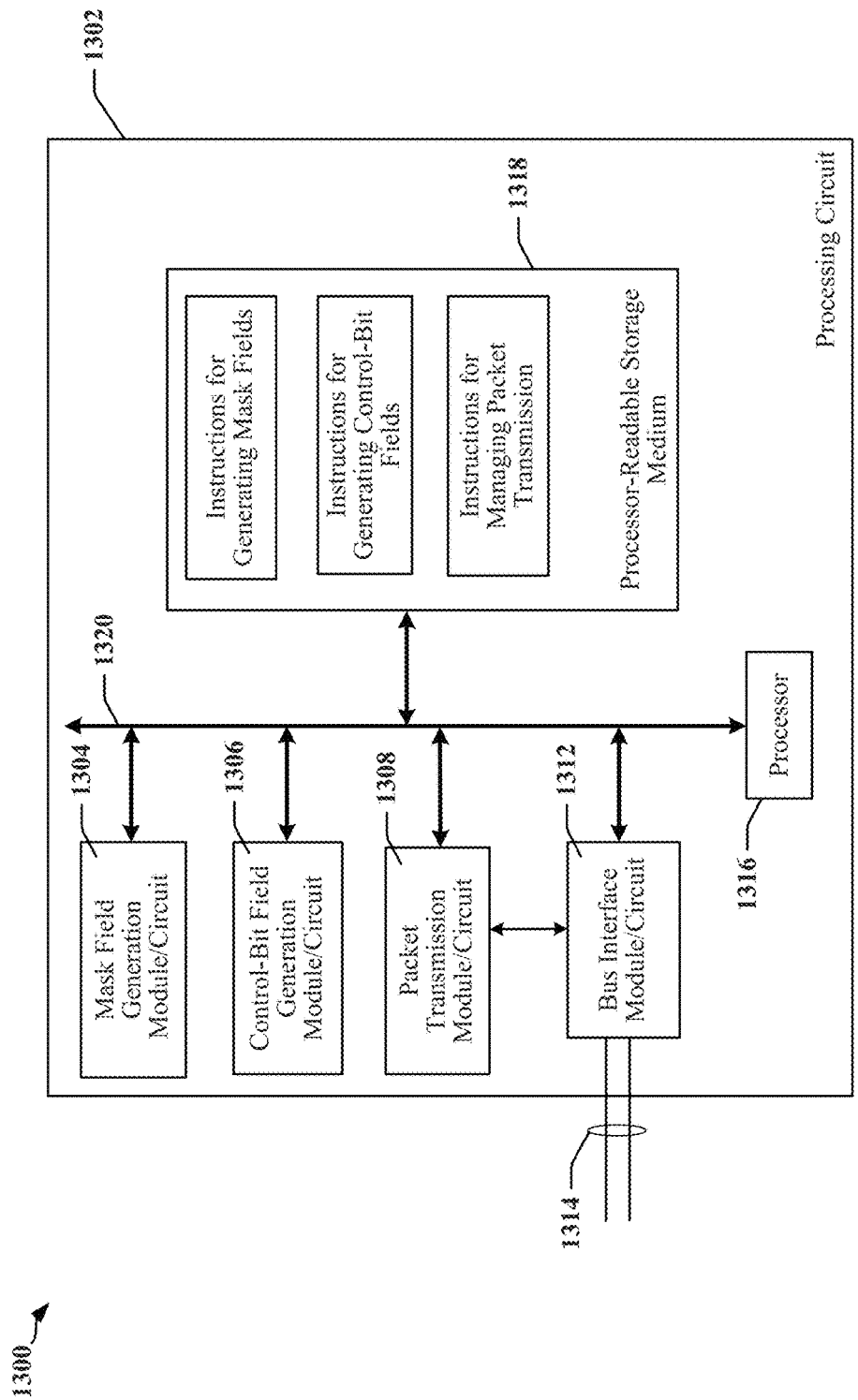
FIG. 13 is a diagram illustrating an example of a hardware implementation for a transmitting apparatus and employing a processing circuit adapted according to certain aspects disclosed herein.

FIG. 13 is a diagram illustrating a simplified example of a hardware implementation for an apparatus 1300 employing a processing circuit 1302 to support operations related to one or more aspects of the disclosure (e.g., aspects related to the method of FIG. 12 described above). The processing circuit typically has a processor 1316 that may include one or more of a microprocessor, microcontroller, digital signal processor, a sequencer and a state machine. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the processor 1316, the modules or circuits 1304, 1306, 1308, line/bus interface circuits 1312 configurable to communicate over connectors or wires 1314 and the computer-readable storage medium 1318. The bus 1320 may also link various other circuits such as timing sources, peripherals, voltage regulators, and power management circuits, which are well known in the art, and therefore, will not be described any further.

The processor 1316 is responsible for general processing, including the execution of code/instructions stored on the computer-readable storage medium 1318. The code/instructions, when executed by the processor 1316, causes the processing circuit 1302 to perform the various functions described supra for any particular apparatus. The computer-readable storage medium may also be used for storing data that is manipulated by the processor 1316 when executing software, including data decoded from symbols transmitted over the connectors or wires 1314, which may be configured as data lanes and clock lanes. The processing circuit 1302 further includes at least one of the modules/circuits 1304, 1306, and 1308. The modules/circuits 1304, 1306, and 1308 may be software modules running in the processor 1316, resident/stored in the computer-readable storage medium 1318, one or more hardware modules coupled to the processor 1316, or some combination thereof. The modules/circuits 1304, 1306, and/or 1308 may include microcontroller instructions, state machine configuration parameters, or some combination thereof.

In one configuration, the apparatus 1300 includes a mask field generation module and/or circuit 1304 that is configured to generate a mask field in a packet to be transmitted through an interface circuit 1312 to a slave device of a communication link, a control-bit field generation module and/or circuit 1306 that is configured to provide a control-bit field in the packet, and a packet transmission module and/or circuit 1308 that is configured to transmit the packet through the interface circuit 1312.

Figure 14:
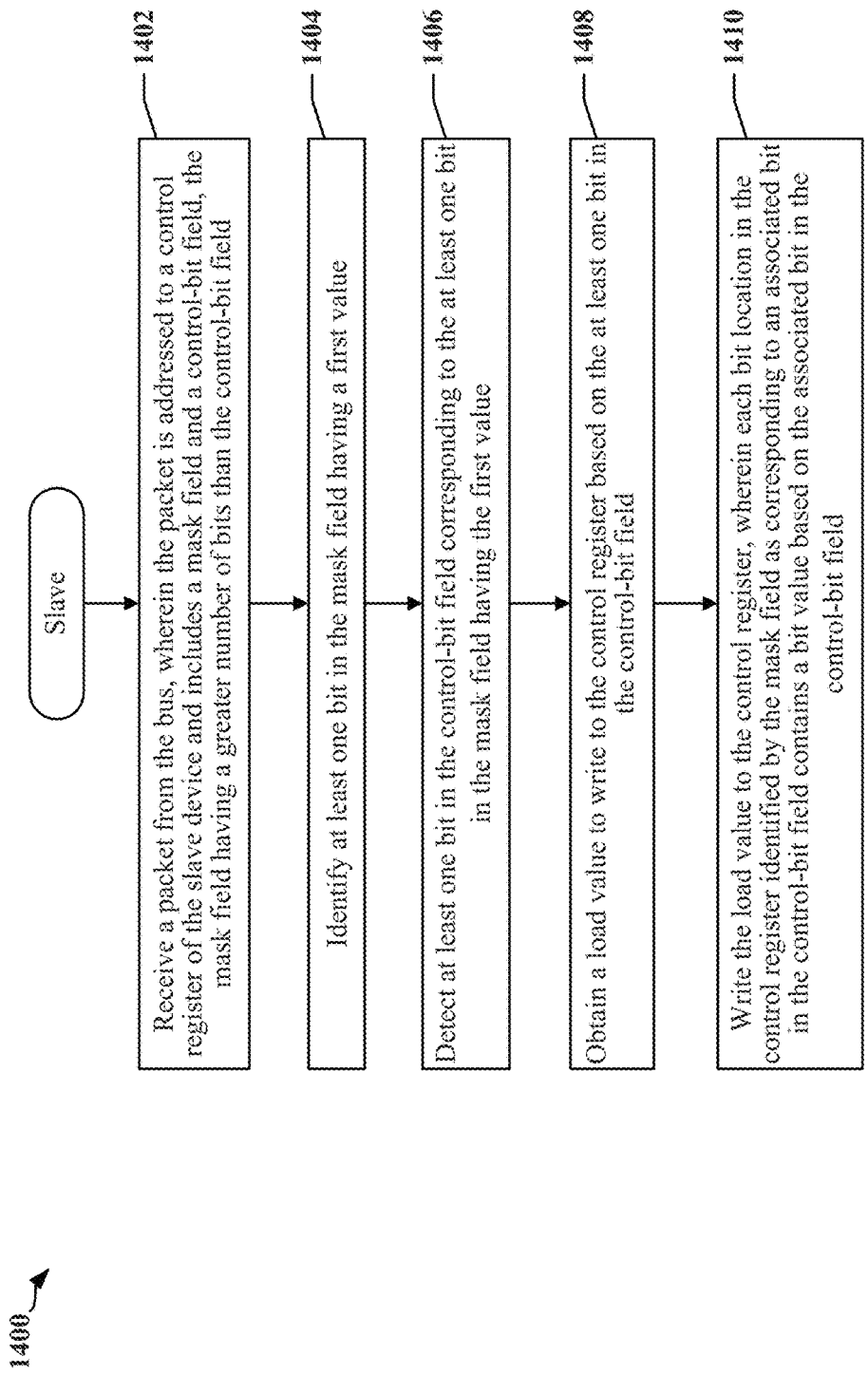
FIG. 14 is a flow chart of a method of data communication performed at a slave device adapted in accordance with certain aspects disclosed herein.

FIG. 14 is a flow chart 1400 of a method of communication using a serial communication link. The method may be performed at a slave device coupled to a bus (e.g., apparatus 1100 of FIG. 11 or apparatus 1500 of FIG. 15).

The slave device may receive a packet from the bus 1402. The packet may be addressed to a control register of the slave device. The packet may include a mask field and a control-bit field. The mask field may have a greater number of bits than the control-bit field. For example, the mask field may include 8 bits while the control-bit field may include less than 8 bits. Alternatively, the mask field may include 16 bits while the control-bit field may include less than 16 bits.

The slave device may identify at least one bit in the mask field having a first value (e.g., a number of mask field bits having a bit value set to '1') 1404. The slave device may further detect at least one bit in the control-bit field corresponding to the at least one bit in the mask field having the first value 1406.

The slave device may obtain a load value to write to the control register based on the at least one bit in the control-bit field 1408. Thereafter, the slave device may write the load value to the control register, wherein each bit location in the control register identified by the mask field as corresponding to an associated bit in the control-bit field contains a bit value based on the associated bit in the control-bit field 1410.

In an aspect of the disclosure, the slave device obtains the load value by reading the control register to obtain an initial value of the control register and merging the at least one bit in the control-bit field with the initial value of the control register to obtain a merged value. Moreover, the slave device writes the load value to the control register by writing the merged value to the control register such that each bit location in the control register identified by the mask field as corresponding to the associated bit in the control-bit field is merged with the associated bit in the control-bit field. In some examples, only bits in the control register identified by the mask field as corresponding to bits in the control-bit field are affected by writing the merged value to the control register.

In one example, the slave device further obtains the load value by writing each bit in the control-bit field to a masking word at a bit location identified by the first value in a corresponding bit location of the mask field (e.g., bit location identified by a value of '1' in a corresponding bit location of the mask field), and writing a predefined masking bit value (e.g., masking bit value of '0' or '1') to each bit location in the masking word identified by a second value in a corresponding bit location of the mask field (e.g., bit location identified by a value of '0' in a corresponding bit location of the mask field). The slave device then merges the at least one bit in the control-bit field with the initial value of the control register using the masking word. The slave device may merge the at least one bit in the control-bit field with the initial value of the control register by performing a logic AND operation between the initial value of the control register and the masking word to generate the merged value. Alternatively, the slave device may merge the at least one bit in the control-bit field with the initial value of the control register by performing a logic OR operation between the initial value of the control register and the masking word to generate the merged value.

In some examples, positions of bit locations in the mask field are independent of positions of bit locations in the control-bit field. That is, the bit locations in the mask field have no positional correspondence to the bit locations in the control-bit field. Moreover, positions of bit locations in the control register are independent of the positions of bit locations in the control-bit field. That is, the bit locations in the control register have no positional correspondence to the bit locations in the control-bit field. However, in an aspect, the positions of bit locations in the mask field directly correspond to the positions of bit locations in the control register.

In one example, the bus is an RFFE bus, and the slave device may be adapted to perform one or more functions of a RF front end. In another example, the bus is an I3C bus.

Figure 15:
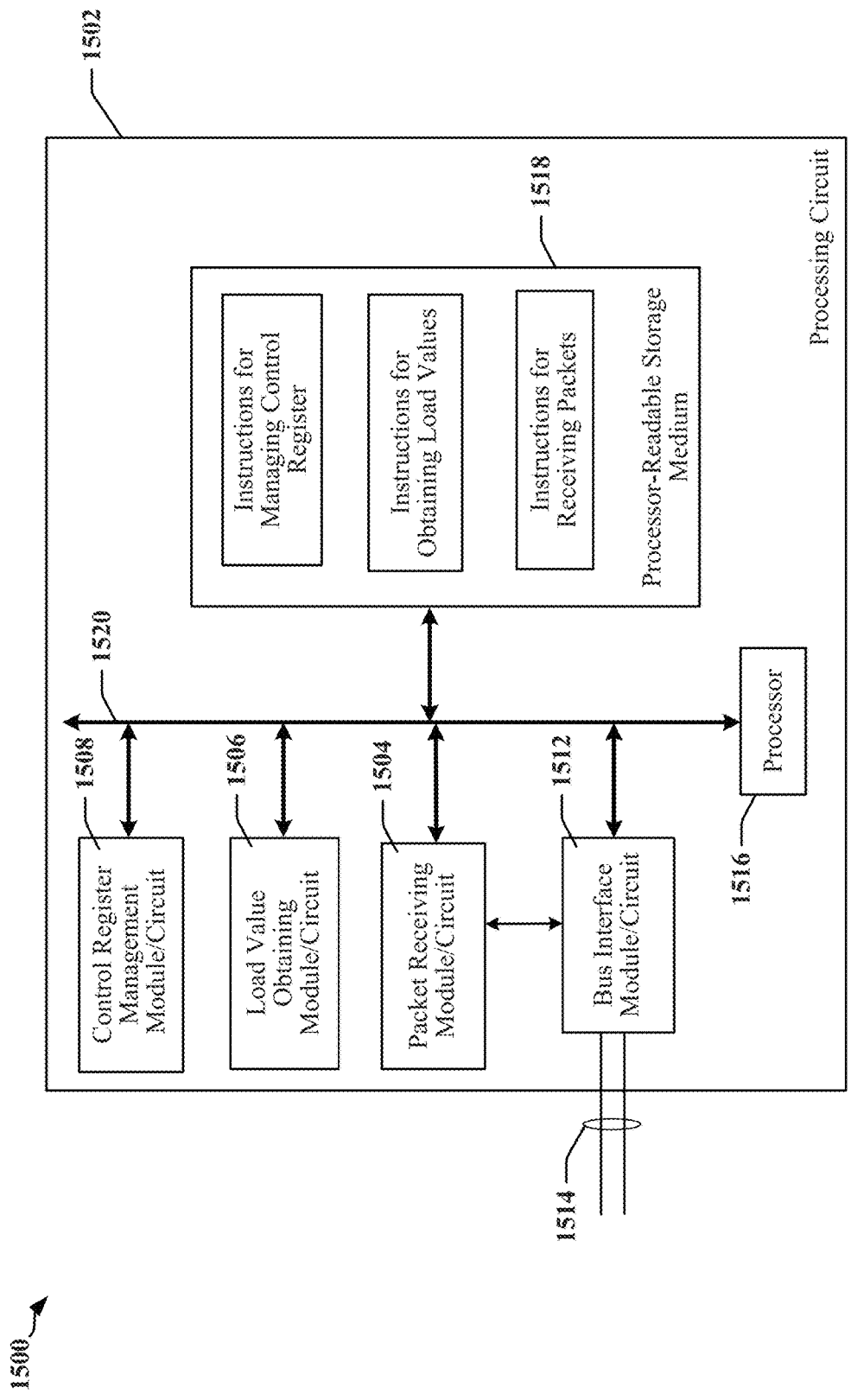
FIG. 15 is a diagram illustrating an example of a hardware implementation for a receiving apparatus and employing a processing circuit adapted according to certain aspects disclosed herein.

FIG. 15 is a diagram illustrating a simplified example of a hardware implementation for an apparatus 1500 employing a processing circuit 1502 to support operations related to one or more aspects of the disclosure (e.g., aspects related to the method of FIG. 14 described above). The processing circuit typically has a processor 1516 that may include one or more of a microprocessor, microcontroller, digital signal processor, a sequencer and a state machine. The processing circuit 1502 may be implemented with a bus architecture, represented generally by the bus 1520. The bus 1520 may include any number of interconnecting buses and bridges depending on the specific application of the processing circuit 1502 and the overall design constraints. The bus 1520 links together various circuits including one or more processors and/or hardware modules, represented by the processor 1516, the modules or circuits 1504, 1506, 1508, line/bus interface circuits 1512 configurable to communicate over connectors or wires 1514 and the computer-readable storage medium 1518. The bus 1520 may also link various other circuits such as timing sources, peripherals, voltage regulators, and power management circuits, which are well known in the art, and therefore, will not be described any further.

The processor 1516 is responsible for general processing, including the execution of code/instructions stored on the computer-readable storage medium 1518. The code/instructions, when executed by the processor 1516, causes the processing circuit 1502 to perform the various functions described supra for any particular apparatus. The computer-readable storage medium may also be used for storing data that is manipulated by the processor 1516 when executing software, including data decoded from symbols transmitted over the connectors or wires 1514, which may be configured as data lanes and clock lanes. The processing circuit 1502 further includes at least one of the modules/circuits 1504, 1506, and 1508. The modules/circuits 1504, 1506, and 1508 may be software modules running in the processor 1516, resident/stored in the computer-readable storage medium 1518, one or more hardware modules coupled to the processor 1516, or some combination thereof. The modules/circuits 1504, 1506, and/or 1508 may include microcontroller instructions, state machine configuration parameters, or some combination thereof.

In one configuration, the apparatus 1500 includes a packet receiving module and/or circuit 1504 that is configured to receive a packet from the connectors or wires 1514 of the bus 1520, wherein the packet is addressed to a control register of the apparatus 1500 and includes a mask field and control-bit field, the mask field having a greater number of bits than the control-bit field. The apparatus 1500 further includes a load value obtaining module and/or circuit 1506 that is configured to identify at least one bit in the mask field having a first value, detect at least one bit in the control-bit field corresponding to the at least one bit in the mask field having the first value, and obtain a load value to write to the control register based on the at least one bit in the control-bit field. The apparatus 1500 also includes a control register management module and/or circuit 1508 that is configured to write the load value to the control register, wherein each bit location in the control register identified by the mask field as corresponding to an associated bit in the control-bit field contains a bit value based on the associated bit in the control-bit field.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed at a device operating as a bus master, comprising:
    generating a mask field in a packet to be transmitted through an interface to a slave device, the mask field having a first number of bits;
    providing a control-bit field in the packet, the control-bit field having a second number of bits, where the second number of bits is less than the first number of bits,
    wherein the mask field is generated to identify at least one bit location in a control register of the slave device in which at least one bit of the control-bit field is to be written by providing a first bit value in each bit location of the mask field that corresponds to a bit location in the control register in which a bit of the of the control-bit field is to be written; and
    transmitting the packet through the interface, wherein the packet is addressed to the control register of the slave device, the control register having the first number of bits, wherein each bit in the control-bit field corresponds to a bit location in the control register that is identified by the mask field.

2. The method of claim 1, wherein the mask field is further generated by providing a second bit value in each bit location of the mask field that does not correspond to a bit location in the control register in which a bit of the control-bit field is to be written.

3. The method of claim 1, wherein:
positions of bit locations in the mask field are independent of positions of bit locations in the control-bit field; and
positions of bit locations in the control register are independent of the positions of bit locations in the control-bit field.

4. The method of claim 1, wherein positions of bit locations in the mask field directly correspond to positions of bit locations in the control register.

5. The method of claim 1, wherein the interface is a radio frequency front end (RFFE) interface.

6. The method of claim 1, wherein the slave device is configured to perform one or more functions of a radio frequency (RF) front end.

7. The method of claim 1, wherein the interface is an I3C interface.

8. A bus master apparatus, comprising:
an interface circuit configured to couple the bus master apparatus to a serial bus; and
a processing circuit configured to:
generate a mask field in a packet to be transmitted through the interface circuit to a slave device, the mask field having a first number of bits,
provide a control-bit field in the packet, the control-bit field having a second number of bits, where the second number of bits is less than the first number of bits,
wherein the mask field is generated to identify at least one bit location in a control register of the slave device in which at least one bit of the control-bit field is to be written by providing a first bit value in each bit location of the mask field that corresponds to a bit location in the control register in which a bit of the of the control-bit field is to be written, and
transmit the packet through the interface circuit, wherein the packet is addressed to the control register of the slave device, the control register having the first number of bits,
wherein each bit in the control-bit field corresponds to a bit location in the control register that is identified by the mask field.

9. The apparatus of claim 8, wherein the processing circuit configured to generate the mask field is further configured to:
provide a second bit value in each bit location of the mask field that does not correspond to a bit location in the control register in which a bit of the control-bit field is to be written.

10. The apparatus of claim 8, wherein:
positions of bit locations in the mask field are independent of positions of bit locations in the control-bit field; and
positions of bit locations in the control register are independent of the positions of bit locations in the control-bit field.

11. The apparatus of claim 8, wherein positions of bit locations in the mask field directly correspond to positions of bit locations in the control register.

12. The apparatus of claim 8, wherein the interface circuit is configured to operate as a radio frequency front end (RFFE) interface, and wherein the slave device is configured to perform one or more functions of a radio frequency (RF) front end.

13. The apparatus of claim 8, wherein the interface circuit is configured to operate as an I3C interface.

14. A method performed at a slave device coupled to a bus, comprising:
receiving a packet from the bus, wherein the packet is addressed to a control register of the slave device and includes a mask field and a control-bit field, the mask field having a greater number of bits than the control-bit field;
identifying at least one bit in the mask field having a first value;
detecting at least one bit in the control-bit field corresponding to the at least one bit in the mask field having the first value;
obtaining a load value to write to the control register based on the at least one bit in the control-bit field; and
writing the load value to the control register, wherein each bit location in the control register identified by the mask field as corresponding to an associated bit in the control-bit field contains a bit value based on the associated bit in the control-bit field.

15. The method of claim 14, wherein:
obtaining the load value includes:
reading the control register to obtain an initial value of the control register, and
merging the at least one bit in the control-bit field with the initial value of the control register to obtain a merged value; and
writing the load value to the control register includes:
writing the merged value to the control register such that each bit location in the control register identified by the mask field as corresponding to the associated bit in the control-bit field is merged with the associated bit in the control-bit field.

16. The method of claim 15, wherein only bits in the control register identified by the mask field as corresponding to bits in the control-bit field are affected by writing the merged value to the control register.

17. The method of claim 15, wherein obtaining the load value further includes:
writing each bit in the control-bit field to a masking word at a bit location identified by the first value in a corresponding bit location of the mask field;
writing a predefined masking bit value to each bit location in the masking word identified by a second value in a corresponding bit location of the mask field; and
merging the at least one bit in the control-bit field with the initial value of the control register using the masking word.

18. The method of claim 17, wherein merging the at least one bit in the control-bit field with the initial value of the control register includes:
performing a logic AND operation between the initial value of the control register and the masking word to generate the merged value.

19. The method of claim 17, wherein merging the at least one bit in the control-bit field with the initial value of the control register includes:
performing a logic OR operation between the initial value of the control register and the masking word to generate the merged value.

20. The method of claim 14, wherein:
positions of bit locations in the mask field are independent of positions of bit locations in the control-bit field; and positions of bit locations in the control register are independent of the positions of bit locations in the control-bit field.

21. The method of claim 14, wherein positions of bit locations in the mask field directly correspond to positions of bit locations in the control register.

22. The method of claim 14, wherein the bus is a radio frequency front end (RFFE) bus, and wherein the slave device is configured to perform one or more functions of a radio frequency (RF) front end.

23. The method of claim 14, wherein the bus is an I3C bus.

24. A slave device, comprising:
an interface circuit configured to couple the slave device to a serial bus; and
a processing circuit configured to:
receive a packet from the serial bus via the interface circuit, wherein the packet is addressed to a control register of the slave device and includes a mask field and a control-bit field, the mask field having a greater number of bits than the control-bit field,
identify at least one bit in the mask field having a first value,
detect at least one bit in the control-bit field corresponding to the at least one bit in the mask field having the first value,
obtain a load value to write to the control register based on the at least one bit in the control-bit field, and
write the load value to the control register, wherein each bit location in the control register identified by the mask field as corresponding to an associated bit in the control-bit field contains a bit value based on the associated bit in the control-bit field.

25. The slave device of claim 24, wherein:
the processing circuit configured to obtain the load value is configured to:
read the control register to obtain an initial value of the control register, and
merge the at least one bit in the control-bit field with the initial value of the control register to obtain a merged value; and
the processing circuit configured to write the load value to the control register is configured to:
write the merged value to the control register such that each bit location in the control register identified by the mask field as corresponding to the associated bit in the control-bit field is merged with the associated bit in the control-bit field.

26. The slave device of claim 25, wherein only bits in the control register identified by the mask field as corresponding to bits in the control-bit field are affected by writing the merged value to the control register.

27. The slave device of claim 25, wherein the processing circuit configured to obtain the load value is further configured to:
write each bit in the control-bit field to a masking word at a bit location identified by the first value in a corresponding bit location of the mask field;
write a predefined masking bit value to each bit location in the masking word identified by a second value in a corresponding bit location of the mask field; and
perform a logic AND operation or a logic OR operation between the initial value of the control register and the masking word to generate the merged value.

28. The slave device of claim 24, wherein:
positions of bit locations in the mask field are independent of positions of bit locations in the control-bit field;
positions of bit locations in the control register are independent of the positions of bit locations in the control-bit field; and
the positions of bit locations in the mask field directly correspond to the positions of bit locations in the control register.

29. The slave device of claim 24, wherein the serial bus is a radio frequency front end (RFFE) bus, and wherein the slave device is adapted to perform one or more functions of a radio frequency (RF) front end.

30. The slave device of claim 24, wherein the serial bus is an I3C bus.

* * * * *